(12) United States Patent
Baltasar Badaya et al.

(10) Patent No.: US 12,169,206 B2
(45) Date of Patent: Dec. 17, 2024

(54) METHOD OF HANDLING LABORATORY SAMPLE CONTAINERS AND APPARATUS FOR HANDLING LABORATORY SAMPLE CONTAINERS

(71) Applicant: Roche Diagnostics Operations, Inc., Indianapolis, IN (US)

(72) Inventors: Raul Baltasar Badaya, Stuttgart (DE); Julian Baumgart, Backnang (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 331 days.

(21) Appl. No.: 16/597,913

(22) Filed: Oct. 10, 2019

(65) Prior Publication Data

US 2020/0124627 A1    Apr. 23, 2020

(30) Foreign Application Priority Data

Oct. 23, 2018  (EP) .................................... 18202153

(51) Int. Cl.
  *G01N 35/00*  (2006.01)
  *G01N 35/02*  (2006.01)
  *G01N 35/04*  (2006.01)

(52) U.S. Cl.
  CPC ..... *G01N 35/00623* (2013.01); *G01N 35/026* (2013.01); *G01N 35/04* (2013.01)

(58) Field of Classification Search
  CPC .......... G01N 35/00623; G01N 35/026; G01N 35/04; G01N 2035/041; G01N 2035/0494;
  (Continued)

(56) References Cited

U.S. PATENT DOCUMENTS

| | | | | |
|---|---|---|---|---|
| 6,544,799 B1 * | 4/2003 | Lewis | .................... | G01N 30/24 |
| | | | | 422/63 |
| 2004/0267405 A1 * | 12/2004 | Ingenhoven | ........... | B25J 19/021 |
| | | | | 700/245 |

(Continued)

FOREIGN PATENT DOCUMENTS

| | | |
|---|---|---|
| CN | 105498887 A | 4/2016 |
| CN | 108052850 A | 5/2018 |

(Continued)

OTHER PUBLICATIONS

European Search Report issued Apr. 17, 2019, in Application No. EP 18202153.5, 2 pp.

(Continued)

*Primary Examiner* — P. Kathryn Wright
*Assistant Examiner* — Curtis A Thompson
(74) *Attorney, Agent, or Firm* — Thomas E. Lees, LLC

(57) ABSTRACT

A method of handling laboratory sample containers is presented. The method comprises moving a laboratory sample container to a target position. The target position is a position at which the laboratory sample container is inserted into a corresponding orifice of a laboratory sample container rack provided that the laboratory sample container rack is placed at an intended position. The laboratory sample container is prevented from moving horizontally more than a predetermined horizontal distance if inserted into the corresponding orifice of the laboratory sample container rack. The method also comprises applying a force in a horizontal direction (xy) to the laboratory sample container, determining if the laboratory sample container moves in the horizontal direction (xy) more than the predetermined horizontal distance, and performing an error procedure if it is determined that the laboratory sample container moves in the (Continued)

horizontal direction (xy) more than the predetermined horizontal distance.

3 Claims, 2 Drawing Sheets

(58) Field of Classification Search
CPC ......... G01N 35/0099; B01L 9/00; B01L 9/50; B01L 2200/04; B01L 2200/143; B01L 2200/18
See application file for complete search history.

(56) References Cited

U.S. PATENT DOCUMENTS

| | | | |
|---|---|---|---|
| 2005/0036913 A1* | 2/2005 | Yamakawa | G01N 35/02 422/65 |
| 2008/0201082 A1 | 8/2008 | Tohma et al. | |
| 2008/0282816 A1 | 11/2008 | Dale et al. | |
| 2013/0069718 A1* | 3/2013 | Ivanov | H03F 3/45928 330/69 |
| 2013/0136569 A1* | 5/2013 | Rosmarin | B25J 9/1612 414/618 |
| 2015/0355169 A1 | 12/2015 | Burd et al. | |
| 2015/0360878 A1 | 12/2015 | Denninger et al. | |
| 2016/0139138 A1 | 5/2016 | Burd et al. | |
| 2016/0266108 A1 | 9/2016 | Burd et al. | |
| 2016/0266163 A1 | 9/2016 | Burd et al. | |
| 2016/0299161 A1* | 10/2016 | Mellars | G01N 35/0099 |
| 2016/0362677 A1 | 12/2016 | Williams et al. | |
| 2018/0021784 A1* | 1/2018 | Weber-Hovendahl | B01L 9/06 211/74 |
| 2019/0160666 A1* | 5/2019 | Pollack | G01N 35/0099 |
| 2019/0277869 A1* | 9/2019 | Stein | G01N 35/026 |
| 2019/0299415 A1* | 10/2019 | Pollack | G01N 35/00693 |
| 2019/0351123 A1* | 11/2019 | Norman | A61M 1/166 |
| 2020/0124628 A1* | 4/2020 | Baltasar Badaya | G01N 35/0099 |

FOREIGN PATENT DOCUMENTS

| | | | |
|---|---|---|---|
| CN | 207628462 U | 7/2018 | |
| JP | S61188032 A | 8/1986 | |
| JP | S62287161 A * | 12/1987 | ............... B01L 9/00 |
| JP | H10-239321 A | 9/1998 | |
| JP | 2009020069 A | 1/2009 | |
| WO | 2015/069547 A1 | 5/2015 | |
| WO | WO-2018013344 A1 * | 1/2018 | ............ B25J 13/081 |

OTHER PUBLICATIONS

Japanese Office action for Japanese Patent Application No. 2019-189264; Japan Patent Office; Tokyo, Japan; dated Aug. 21, 2023.

* cited by examiner

METHOD OF HANDLING LABORATORY SAMPLE CONTAINERS AND APPARATUS FOR HANDLING LABORATORY SAMPLE CONTAINERS

CROSS-REFERENCE TO RELATED APPLICATIONS

This application claims priority to EP 18202153.5, filed Oct. 23, 2018, which is hereby incorporated by reference.

BACKGROUND

The present disclosure generally relates to a method of handling laboratory sample containers and to an apparatus for handling laboratory sample containers.

There is a need for an apparatus and method of handling laboratory sample containers that can ensure the safe handling of the laboratory sample containers.

SUMMARY

According to the present disclosure, an apparatus and method of handling laboratory sample containers are presented. The method can comprise moving a laboratory sample container to a target position (TP). The target position (TP) can be a position at which the laboratory sample container can be inserted into a corresponding orifice of a laboratory sample container rack provided that the laboratory sample container rack is placed at an intended position. The laboratory sample container can be prevented from moving horizontally more than a predetermined horizontal distance ($\Delta xy$) if inserted into the corresponding orifice of the laboratory sample container rack. The method can also comprise applying a force ($Fxy$) in a horizontal direction (xy) to the laboratory sample container, determining if the laboratory sample container moves in the horizontal direction (xy) more than the predetermined horizontal distance ($\Delta xy$), and performing an error procedure if it is determined that the laboratory sample container moves in the horizontal direction (xy) more than the predetermined horizontal distance ($\Delta xy$).

Accordingly, it is a feature of the embodiments of the present disclosure to provide for an apparatus and method of handling laboratory sample containers that can ensure the safe handling of the laboratory sample containers. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
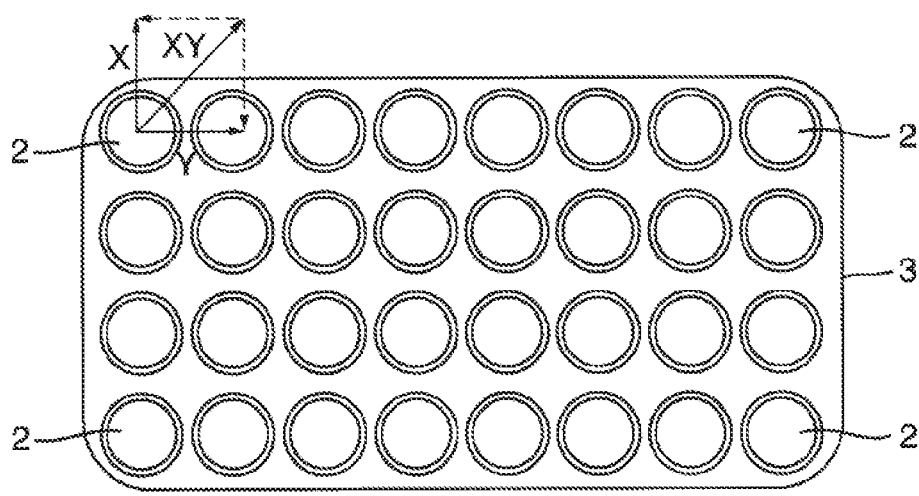
FIG. 1 illustrates a laboratory sample container rack in a top view according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The method of present disclosure for handling laboratory sample containers can comprise the following steps. Step a), namely moving a laboratory sample container, for example, in the form of a laboratory sample container tube (also known as a tube), to a target position. The target position can be a position of the laboratory sample container at which the laboratory sample container can be inserted into a corresponding orifice, or receptacle, of a laboratory sample container rack provided that the laboratory sample container rack is placed at an intended (or scheduled/expected) position. Laboratory sample container racks can typically be configured to store a number (for example, 2 to 128) of laboratory sample containers in corresponding orifices or receptacles. The number of laboratory sample containers to be stored in the laboratory sample container rack can depend on the type of the laboratory sample container rack. Reference insofar can also be made to the relevant technical literature. The laboratory sample container can be prevented from moving horizontally more than a predetermined horizontal distance, for example, about 0.1 mm to about 10 mm, if correctly inserted into the corresponding orifice of the laboratory sample container rack. The predetermined horizontal distance can depend on the mechanical and geometrical properties of the laboratory sample container racks used and can typically be a priori known.

The method can further comprise the following steps, namely b), applying a force in a horizontal direction to the laboratory sample container, c) determining if the laboratory sample container can move more than the predetermined horizontal distance, and d) performing an error procedure if it is determined that the laboratory sample container can move more than the predetermined horizontal distance.

The force can typically be chosen such that the laboratory sample container may not be damaged. If it is determined that the laboratory sample container does not move more than the predetermined horizontal distance, it may be deduced that the laboratory sample container rack is placed at the intended position.

According to an embodiment, the laboratory sample container can be held by a gripping device having two gripping fingers. The gripping fingers can be moved towards each other along a gripping direction during a gripping operation. During step b), the force can be applied in the gripping direction. This can avoid the tilting and displacement of the laboratory sample container.

According to an embodiment, after step a) and before steps b) to d), the following steps can be performed: e) applying a force in a vertical direction to the laboratory sample container, f) determining if the laboratory sample container can move in the vertical direction more than a predetermined vertical distance such as, for example, about 0.1 mm to about 10 mm, and g) performing steps b) to d) if it is determined that the laboratory sample container can move in the vertical direction more than the predetermined vertical distance. If it is determined that the laboratory sample container does not move more than the predetermined vertical distance, it may be directly determined that the laboratory sample container rack is placed at its intended position. Steps e) to g) may be denoted as rack detection in the z dimension.

By the steps e) and f), a first check can be performed if the laboratory sample container rack is placed at the intended position. If the laboratory sample container rack is placed at the intended position, the vertical movement of the laboratory sample container can be limited to the predetermined vertical distance since as soon as the laboratory sample container is fully inserted into the orifice, the laboratory sample container rack can form a stopper such that a further vertical movement can be prevented. If a significant movement in the z direction is determined, it can be deduced that the laboratory sample container rack is not placed at its intended position. Nevertheless, under certain circumstances, although the laboratory sample container rack can be placed at its intended position, a vertical movement of the laboratory sample container may occur, for example, because the laboratory sample container is not fully inserted into the orifice of the laboratory sample container rack and/or a slip between a gripper gripping the laboratory sample container and the laboratory sample container can occur. To prevent a false result that no laboratory sample container rack is placed at the intended position despite that the laboratory sample container rack is placed correctly, steps b) to d) can be performed to implement a second check which may be denoted as rack detection in the xy dimension. If it is determined that the laboratory sample container can also move in the horizontal direction, an error processing can be performed.

According to an embodiment, the step of moving the laboratory sample container to the target position and the steps of applying forces to the laboratory sample container can be performed by one or more electric motors. The electric motor(s) can be operated in a torque mode and in a velocity mode (also called speed mode or standalone mode). In the torque mode, the electric motor can provide an adjustable torque. In the velocity mode, the electric motor can provide an adjustable velocity or speed. The step of moving the laboratory sample container to the target position may be performed using the velocity mode and the step of applying forces to the laboratory sample container may be performed using the torque mode.

According to an embodiment, the step of performing an error procedure can comprise the step of: generating an error message indicating that the laboratory sample container rack is not placed at the intended position. The errors message may be, for example, embodied as an acoustical sign and/or as a visual sign and/or as corresponding data being transmitted to a receiver.

The apparatus for handling laboratory sample containers can be configured to perform the above described method.

According to an embodiment, the apparatus can comprise one or more electric motors configured to move the laboratory sample container.

According to an embodiment, the apparatus can comprise a gripping device having two or more gripping fingers configured to grip a laboratory sample container.

According to the present disclosure, when laboratory sample containers are to be placed into corresponding orifices of laboratory sample container racks, for example, during an out sort operation, it can be monitored if the laboratory sample container rack is placed at its intended position. If it is determined that the laboratory sample container rack is not placed at its intended position, an error procedure can be performed, for example, by preventing a gripper from handling the laboratory sample container that is opened so that the laboratory sample container may fall onto a surface causing pollution.

The present disclosure is based on the finding that if the laboratory sample container is inserted in the orifice of the rack, it can be possible to detect the presence of the rack by applying a horizontal force to the laboratory sample container. If the laboratory sample container rack is placed at its intended position, the laboratory sample container rack can prevent movement of the laboratory sample container in the xy dimension. Thus, if the laboratory sample container does not move, it can be deduced that the laboratory sample container rack is placed at its intended position. If the laboratory sample container moves, it can be deduced that the laboratory sample container rack is not placed at its intended position. To detect the movement, a motor encoder feedback, for example, may be used.

In output sorter units where laboratory sample containers in the form of tubes have to be placed into racks, the presence of racks has to be validated before opening a gripper handling the tubes. This may be, for example, done by pushing the tubes towards an expected rack bottom and, for example, using a motor encoder feedback, detecting the expected collision. This may be called detection in the z dimension. Nevertheless, when the detection in the z dimension returns false results (false negative), indicating that there is no rack despite the fact that a rack is present, unnecessary user interactions can be caused.

Assuming that the tube is already inserted in the rack, but not yet in contact with the rack bottom, it can be possible to detect the presence of the rack by doing a diagonal movement in the xy dimension and, for example, using the motor encoder feedback in the same way as in the detection in the z dimension to detect a collision between the tube and the expected rack.

This movement may have the following properties. The diagonal movement can be done in a substantially perpendicular direction to the gripper plane to avoid the tilting and displacement of the tube. The x- and y-motors can move simultaneously and in the same distance. The x- and y-motor parameters can ensure smooth movement and immediate stop when the rack is detected. Once the rack is detected, the tube can be returned to its original position in the xy dimension and a gripper can be opened in order to leave the tube at its original position.

To ensure the correct placement of a tube at the rack bottom, the rack detection in the z dimension may be combined with the inventive rack detection in the xy dimension.

First, rack detection in the z dimension can be performed. If the rack is detected, the method may be terminated with positive rack detection.

If the rack is not detected, rack detection in the xy dimension may be performed. At this point, it can be assumed that the first detection in the z dimension can leave the tube already inserted in the rack (a pre-condition for the xy dimension detection).

If the rack is not detected, the method may terminate with a result indicating that no rack is present.

If the rack is detected in the xy dimension, the rack detection in the z dimension may be performed again, increasing the insertion depth, as the presence of a rack can be safely assumed.

If the rack is then detected in the z dimension, a positive rack detection result can be returned.

If the rack is not detected in the z dimension, an unknown rack detection error can be returned.

The present disclosure can add extra robustness and can highly reduce the amount of "false negatives" in rack detection thus reducing the user interaction and extending the walk away time of the device.

The present disclosure can, for example, be used in the following scenario. A laboratory sample container or tube has to be inserted into a rack. It can be assumed that the tube can initially be inserted into the rack somewhat elevated at the target position such that the standard rack detection in the z dimension can return a false negative although the rack is present. Now, the rack detection in the xy dimension can be performed reporting that a rack is present. Then, the tube can be picked at a higher position and the rack detection in the z dimension can be performed again. If the rack detection in the z dimension fails again, a "no rack detected" error can be outputted. If the rack is detected in the z dimension, "rack detected" can be outputted.

Referring initially to FIG. 1, FIG. 1 depicts a conventional laboratory sample container rack 3 in a bottom view. The laboratory sample container rack 3 can comprise a number of orifices 2, such as, for example 32 orifices, configured to receive conventional laboratory sample containers 1, also denoted as tubes, see FIG. 2.

Figure 2:
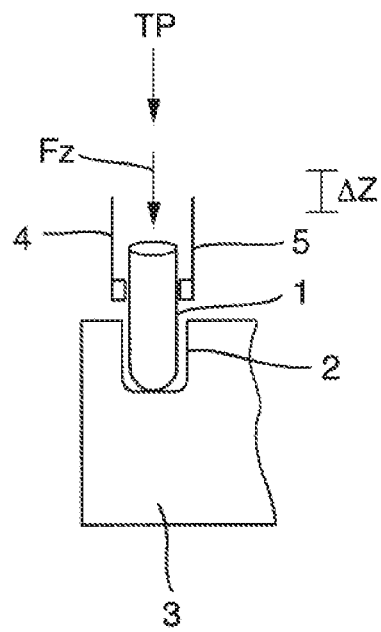
FIG. 2 illustrates highly schematically cross section of a part of the laboratory sample container rack depicted in FIG. 1 in a side view containing a laboratory sample container inserted into an orifice of the laboratory sample container rack according to an embodiment of the present disclosure.

FIG. 2 highly schematically depicts a cross section of a part of the laboratory sample container rack 3 depicted in FIG. 1 in a side view. A laboratory sample container 1 can be inserted into one of the orifices 2. The laboratory sample container 1 can be held by two gripping fingers 4, 5 of a conventional gripping device 7, see also FIG. 3.

Figure 3:
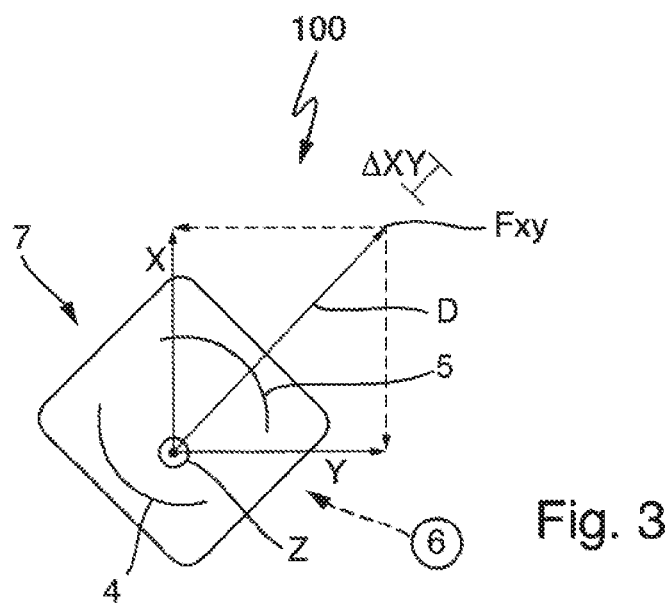
FIG. 3 illustrates highly schematically a gripping device in a bottom view according to an embodiment of the present disclosure.

FIG. 3 highly schematically depicts the gripping device 7 comprising the fingers 4, 5 in a top view. Reference can be made insofar also to the relevant technical literature.

The gripping device 7 can be part of an apparatus 100. The apparatus 100 can comprise a number of electric motors 6 configured to move the laboratory sample container 1 by driving the gripping device 7. For the sake of explanation, only a single electric motor 6 is depicted. Self-evidently, the apparatus may contain a sufficient number of electric motors 6 to enable the necessary degrees of motional freedom. For example, three electric motors 6 may be provided, one for driving an x axis, one for driving a y axis and one for driving a z axis. Gripping fingers may be actuated by a further motor.

The operation of the apparatus will be described in detail below.

If a laboratory sample container 1 is to be inserted into a corresponding orifice 2 of the laboratory sample container rack 3, the laboratory sample container 1 can be moved to a target position TP by the gripping device 7. The target position TP can be a position at which the laboratory sample container 1 can be inserted into a corresponding orifice 2 of a laboratory sample container rack 3, as depicted in FIG. 2, provided that the laboratory sample container rack 3 is placed at an intended position.

The laboratory sample container 1 can be prevented from moving horizontally more than a predetermined horizontal distance Δxy, see FIG. 3, if inserted into the corresponding orifice 2 of the laboratory sample container rack 3. Δxy may, for example, range between about 0.1 mm and about 1 mm, depending on the type of rack 3 used.

After moving the laboratory sample container 1 to the target position TP, a vertical force Fz can be applied in a vertical direction z to the laboratory sample container 1.

Then, it can be determined if the laboratory sample container 1 moves in the vertical direction z more than a predetermined vertical distance Δz such as, for example, about 0.1 mm. If the laboratory sample container rack 3 is placed at its intended position and if the laboratory sample container 1 is fully inserted into the orifice 2, the laboratory sample container 1 can be prevented from moving in the vertical direction z more than predetermined vertical distance Δz.

If no relevant movement in the vertical direction z is measured, it can be deduced that the laboratory sample container rack 3 is placed at its intended position and the gripping device 7 can open the gripping fingers 4 and 5, elevate the gripping fingers 4 and 5 in the z direction, and may perform a further gripping operation.

On the other hand, if it is determined that the laboratory sample container 1 moves in the vertical direction z more than the predetermined vertical distance Δz, a further check can be performed to evaluate if the laboratory sample container rack 3 is placed at its intended position to prevent false negative results.

Therefore, a force Fxy in a horizontal direction xy can be applied to the laboratory sample container 1. Then, it can be determined if the laboratory sample container 1 moves in the horizontal direction xy more than the predetermined horizontal distance Δxy such as, for example, about 0.2 mm.

If it is determined that the laboratory sample container 1 moves in the horizontal direction xy more than the predetermined horizontal distance Δxy an error procedure can be performed, for example, by generating an error message.

If on the other hand, it is determined that the laboratory sample container 1 does not move in the horizontal direction xy more than the predetermined horizontal distance Δxy, it can be deduced that the laboratory sample container rack 3 is placed at its intended position. Consequently, the gripper may release the laboratory sample container 1 and may perform a further gripping operation. Alternatively, a further check in the z direction may be performed.

Referring to FIG. 3, the gripping fingers 4, 5 can be moved towards each other along a gripping direction D during a gripping operation. The force Fxy can be applied in the gripping direction D.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method of handling laboratory sample containers, the method comprising:
   a) using an apparatus comprising at least one motor in conjunction with a gripping device to move a laboratory sample container to a target position (TP), wherein the target position (TP) is a position at which the laboratory sample container is inserted into a corresponding orifice of a laboratory sample container rack provided that the laboratory sample container rack is placed at an intended position, wherein the laboratory sample container is prevented from moving horizontally more than a predetermined horizontal distance ($\Delta xy$) if inserted into the corresponding orifice of the laboratory sample container rack;
   b) applying a force (Fxy) through the at least one motor and gripping device in a horizontal direction (xy) to move the laboratory sample container;
   c) using feedback from the motor to determine movement of the laboratory sample container in the horizontal direction (xy) more than the predetermined horizontal distance ($\Delta xy$), where the feedback includes a determination that no false negative resulting from applying the force (Fxy) in the horizontal direction (xy) is present; and
   d) performing an error procedure upon a determination that movement of the laboratory sample container in the horizontal direction (xy) more than the predetermined horizontal distance ($\Delta xy$) has occurred by: generating an error message indicating that the laboratory sample container rack is not placed at the intended position, wherein the error message is generated by producing an acoustic sign and/or a visual sign and/or data; and preventing the gripping device from releasing the laboratory sample container based on the generated error message.

2. The method according to claim 1, wherein the gripping device comprises two gripping fingers that are moved towards each other along a gripping direction (D) during a gripping operation, and wherein during step b), the force (Fxy) in the horizontal direction (xy) is applied in the gripping direction (D).

3. The method according to claim 1, wherein the predetermined horizontal distance comprises a range of between about 0.1 mm and about 1.0 mm.

* * * * *